US009055145B1

(12) United States Patent
Su et al.

(10) Patent No.: US 9,055,145 B1
(45) Date of Patent: Jun. 9, 2015

(54) RECOVERY OF DTMF TONES IN THE PRESENCE OF PERIODIC INTERFERENCE AND OBSTRUCTION

(71) Applicant: The United States of America, as represented by the Secretary of the Army, Washington, DC (US)

(72) Inventors: Wei Su, Bel Air, MD (US); Muhammed Karim, Ocean Township, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 125 days.

(21) Appl. No.: 14/011,813

(22) Filed: Aug. 28, 2013

(51) Int. Cl.
*H04M 7/12* (2006.01)
*H04Q 1/453* (2006.01)
*H04M 1/56* (2006.01)
*H04M 3/00* (2006.01)

(52) U.S. Cl.
CPC ............. *H04M 7/1295* (2013.01); *H04Q 1/453* (2013.01)

(58) Field of Classification Search
None
See application file for complete search history.

(56) References Cited

U.S. PATENT DOCUMENTS

| 6,873,701 | B1 * | 3/2005 | Tian et al. ...................... 379/386 |
| 2003/0224741 | A1 | 12/2003 | Sugar et al. |
| 2006/0056496 | A1 | 3/2006 | Smee et al. |
| 2006/0217166 | A1 * | 9/2006 | Swanson ...................... 455/701 |
| 2007/0060061 | A1 | 3/2007 | Sampath |
| 2007/0091873 | A1 | 4/2007 | LeBlanc et al. |
| 2007/0116242 | A1 * | 5/2007 | Chen ............................ 379/283 |
| 2010/0008493 | A1 | 1/2010 | Marum et al. |
| 2010/0290334 | A1 | 11/2010 | Marx |

* cited by examiner

Primary Examiner — Fan Tsang
Assistant Examiner — Jeffrey Lytle
(74) Attorney, Agent, or Firm — Azza Jayaprakash

(57) ABSTRACT

While a dual tone multi-frequency (DTMF) signal can be easily processed if cleanly obtained, difficulties can arise if the DTMF signal is not cleanly obtained. In one example, part of the signal can be cleanly obtained, but part of the signal can be obstructed. In order to determine the content of the DTMF signal the parts that are cleanly obtained can be compared with known DTMF signals, such as DTMF signals that correspond with buttons on a telephone keypad. A classification of a closest matching known DTMF signal can be identified and that classification can be assigned to the partially obtained DTMF signal. Thus, without clearly obtaining the whole DTMF signal a content of the DTMF signal can be ascertained.

20 Claims, 21 Drawing Sheets

RECOVERY OF DTMF TONES IN THE PRESENCE OF PERIODIC INTERFERENCE AND OBSTRUCTION

GOVERNMENT INTEREST

The innovation described herein may be manufactured, used, imported, sold, and licensed by or for the Government of the United States of America without the payment of any royalty thereon or therefore.

CROSS-REFERENCE

The subject application is related to U.S. patent application Ser. No. 14/011,815 that was filed on Aug. 28, 2013 with a title of "DETECTION AND IDENTIFICATION OF SYNCHRONIZING SIGNALS EMBEDDED IN VOICE OR DATA" and U.S. patent application Ser. No. 14/011,815 herein incorporated by reference.

BACKGROUND

A dual tone multi-frequency (DTMF) signal can be used in a variety of applications, such as in telephone communication. The DTMF signal can be cleanly obtained and analyzed. Based on a result of this analysis, content of the DTMF can be determined. This content can then be used to determine a number of a keypad designated by a user.

SUMMARY

A system is disclosed comprising a comparison component, an identification component, and a processor. The comparison component is configured to compare a signal part group of a dual tone signal against a known signal set to produce a comparison result, where the signal part group is less than the signal. The identification component is configured to perform an identification of a known signal that matches the dual tone signal through use of the comparison result, where the known signal is part of the known signal set. The processor is configured to execute an instruction that relates to the comparison component or the identification component In addition, a method is disclosed comprising executing instructions from a non-transitory computer-readable medium. The instructions comprise sampling segments of a signal that is dual tone and periodic, where the segments are outside of obstructions. The instructions also comprises selecting a segment from the sampled segments as a reference segment as well as combining the reference segment with at least one other sampled segment to form a combined segment. In addition, the instructions comprise performing a Fast Fourier transform upon the combined segment that produces a transform result. Also, the instructions comprise making an attempt to locate a match signal for the signal through use of the transform result and causing a dataset that pertains to the match signal to be outputted in response to the match signal being located.

Furthermore, a non-transitory computer-readable medium configured to store computer-executable instructions that when executed by a processor cause the processor to perform a method is disclosed. The method comprises collecting a plurality of parts of an unknown signal, where a combination of the plurality of parts of the signal is less than the unknown signal and where the unknown signal is a dual tone signal and a periodic signal. The method also comprises selecting a set of parts from the plurality of parts to form a subset of parts, where the subset of parts is smaller than the plurality of parts. The method further comprises combining the subset of parts into a combined version and performing a Fast Fourier transform upon the combined version to produce a signal result. Additionally, the method comprises comparing the signal result against a set of known signals to produce a comparison result. Also, the method comprises identifying a best match known signal from the set of known signals through use of the comparison result and classifying the unknown signal as a signal type of the best match known signal.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
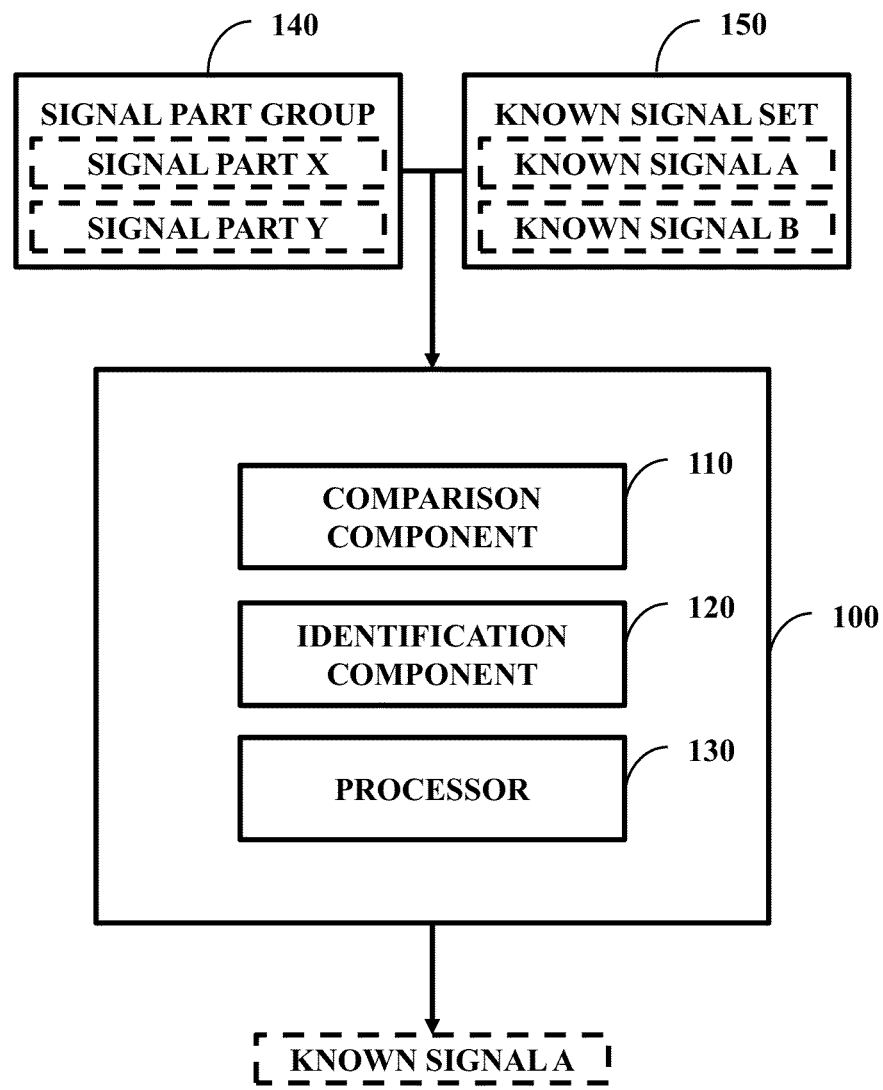
FIG. 1 illustrates one embodiment of a system comprising a comparison component, an identification component, and a processor.

While the dual tone multi-frequency (DTMF) signal can be easily processed if cleanly obtained, difficulties can arise if the DTMF signal is not cleanly obtained. In one example, part of the signal can be cleanly obtained, but part of the signal can be obstructed. In order to determine the content of the DTMF signal the parts that are cleanly obtained can be compared with known DTMF signals, such as DTMF signals that correspond with buttons on a telephone keypad. A classification of a closest matching known DTMF signal can be identified and that classification can be assigned to the partially obtained DTMF signal. Thus, without clearly obtaining the whole DTMF signal a content of the DTMF signal can be ascertained.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a comparison component 110, an identification component 120, and a processor 130. The comparison component 110 is configured to compare a signal part group 140 of a dual tone signal against a known signal set 150 to produce a comparison result, where the signal part group 140 (e.g., the signal part group is a combination of discontinued signal segments and is much less than the entire signal length) is less than the signal (e.g., not the whole signal). The identification component 120 is configured to perform an identification of a known signal (e.g., known signal A) that matches the dual tone signal through use of the comparison result, where the known signal is part of the known signal set 150. The processor 130 is configured to execute an instruction that relates to the comparison component 110 or the identification component 120.

A dual tone signal (e.g., DTMF) can be received by the system 100, but part of the signal can be obstructed. Therefore, the entire content of the dual tone signal may be unavailable and in turn understanding the message sent by the dual tone signal can be difficult to ascertain. At least a fraction of the part of the dual tone signal that is not obstructed can be identified and compared to various known signals (e.g., known signal A and known signal B) of a known signal set. Based on a result of this comparison, a best matching known signal can be identified as the dual tone signal.

In one example, sixteen possible messages can be transferred by way of the dual tone signal: 0-9, *, #, and A-D. Each of these messages can relate to two tones being present in the dual tone signal. For each of the messages a known signal can be retained as part of the known signal set 150. The signal part group 140 can be compared with each of the known signals and/or until a matching signal is found. Based on this comparison, a known signal that matches the signal part group 140 can be identified as a matching signal.

Figure 2:
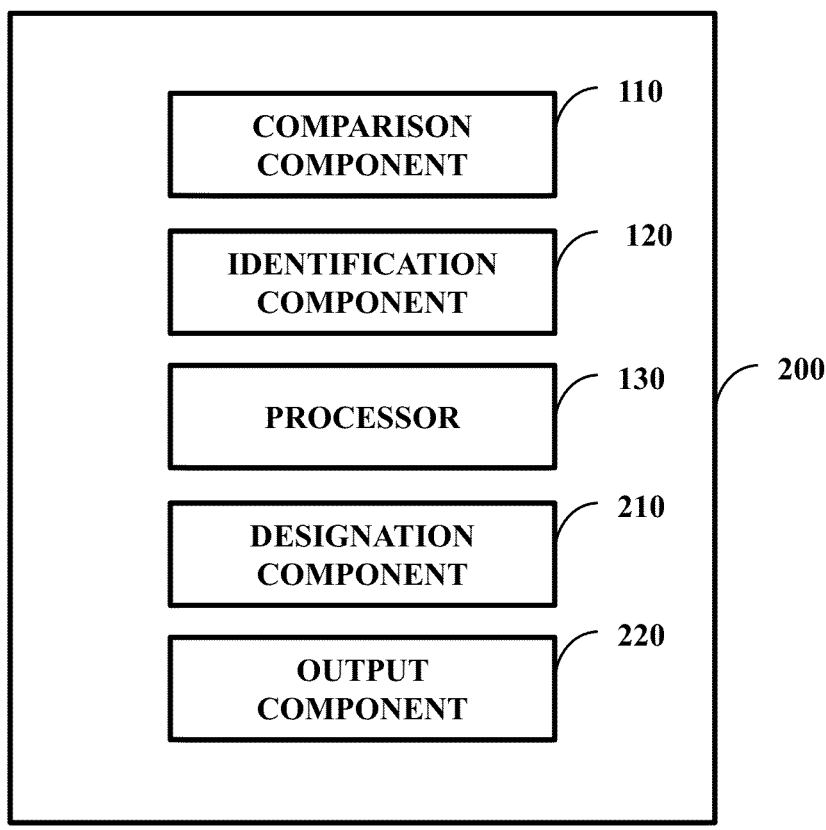
FIG. 2 illustrates one embodiment of a system comprising the comparison component, the identification component, the processor, a designation component, and an output component.

FIG. 2 illustrates one embodiment of a system 200 comprising the comparison component 110, the identification component 120, the processor 130, a designation component 210, and an output component 220. The designation component 210 is configured to make a designation of the dual tone signal as the known signal. The output component 220 is configured to cause the designation to be outputted.

Once the identification of the matching signal is performed, the designation component 210 can cause the system 200 to consider the dual tone signal to be equal to the matching known signal and thus to be the matching known signal. The output component 220 can cause an output to be produced that classifies dual tone signal as the matching known signal. In one example, this output can be to a telephone and designate a number of a keypad selected thought use of the dual tone signal.

Figure 3:
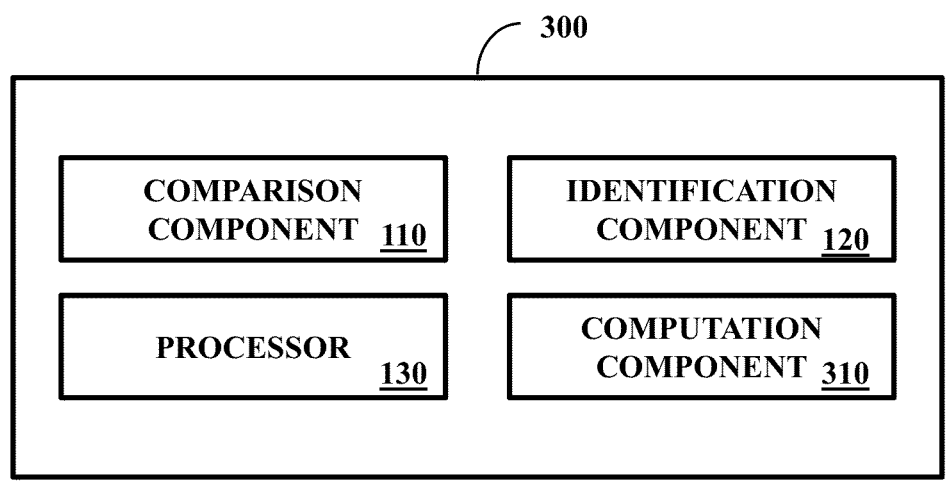
FIG. 3 illustrates one embodiment of a system comprising the comparison component, the identification component, the processor, and a computation component.

FIG. 3 illustrates one embodiment of a system 300 comprising the comparison component 110, the identification component 120, the processor 130, and a computation component 310. The computation component 310 is configured to perform a Fast Fourier transform upon the signal part group.

A result of performance of the Fast Fourier transform indicates at least one frequency (e.g., two frequencies) of the signal part group. The identification component 120 uses the at least one frequency to perform the identification.

Figure 4:
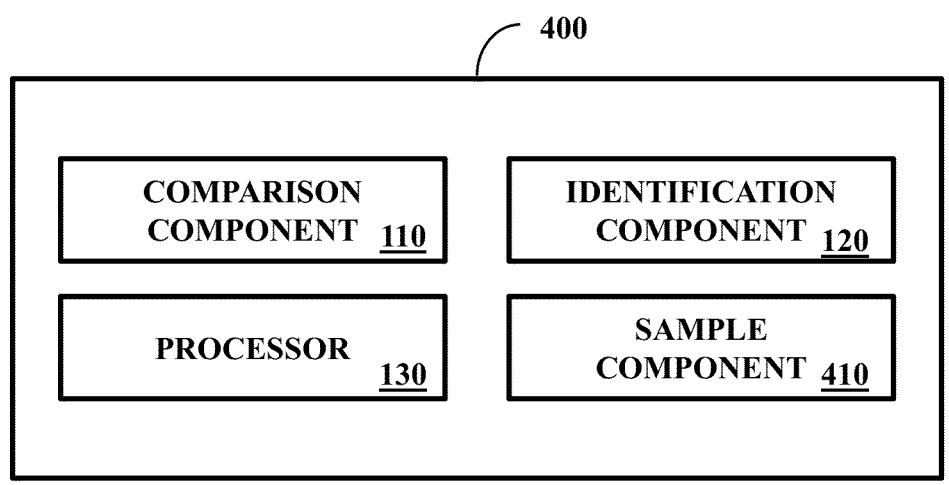
FIG. 4 illustrates one embodiment of a system comprising the comparison component, the identification component, the processor, and a sample component.

FIG. 4 illustrates one embodiment of a system 400 comprising the comparison component 110, the identification component 120, the processor 130, and a sample component 410. The sample component 410 is configured to sample the dual tone signal to produce the signal part group.

Figure 5:
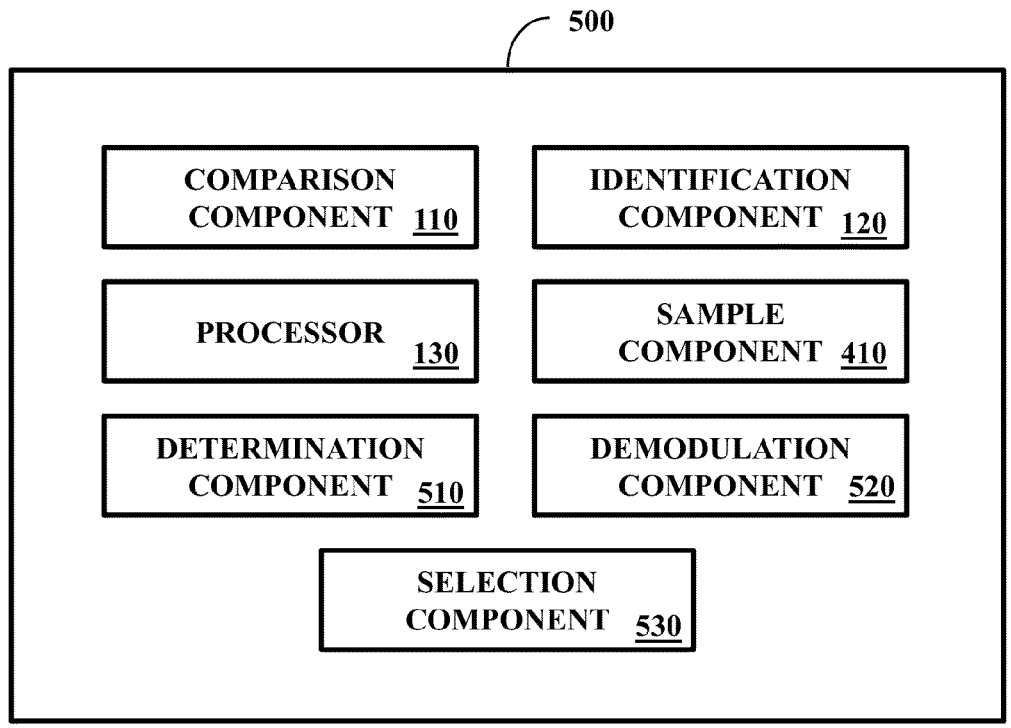
FIG. 5 illustrates one embodiment of a system comprising the comparison component, the identification component, the processor, the sample component, a determination component, a demodulation component, and a selection component.

FIG. 5 illustrates one embodiment of a system 500 comprising the comparison component 110, the identification component 120, the processor 130, the sample component 410, a determination component 510, a demodulation component 520, and a selection component 530. The determination component 510 is configured to make a determination if a received signal (e.g., the dual tone signal before it is known that the received signal is dual tone) is a Radio Frequency signal. The demodulation component 520 is configured to demodulate the dual tone signal in response to the dual tone signal being the Radio Frequency signal. The selection component 530 is configured to make a selection of a signal part of the dual tone signal after demodulation if the determination is that the dual tone signal is the Radio Frequency signal. The selection component 530 is also configured to make the selection of the signal part of the dual tone signal after the dual tone signal is sampled if the determination is that the dual tone signal is not the Radio Frequency signal.

While a portion of the signal may be obstructed, it may be desirable to use less than the entire signal that is not obstructed. Therefore, the selection component 530 can select portions of the signal that is not obstructed to form the signal part group. In one example, the selection component 530 can select signal parts that become members of the signal part group based, at least in part, on distance from a reference signal part.

Figure 6:
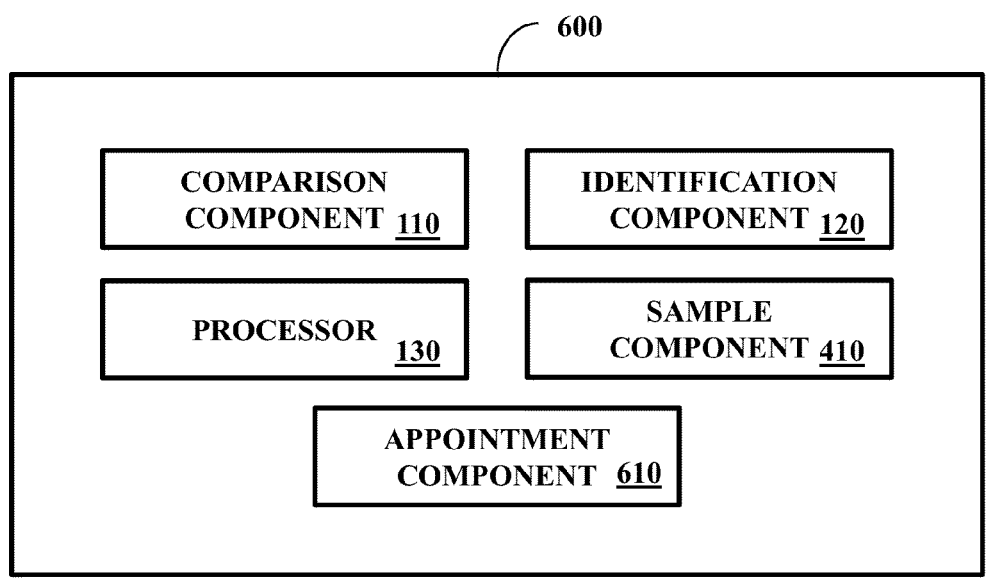
FIG. 6 illustrates one embodiment of a system comprising the comparison component, the identification component, the processor, the sample component, and an appointment component.

FIG. 6 illustrates one embodiment of a system 600 comprising the comparison component 110, the identification component 120, the processor 130, the sample component 410, and an appointment component 610. The appointment component 610 is configured to appoint the signal part group. The sample component 410 samples the received signal (e.g., after reception, before being identified as dual tone, etc.) to produce a signal part set that comprises the signal part group as well as a discarded signal part set that is not part of the signal part group.

In one example, the sample component 410 samples the dual tone signal to produce a signal part set. Once sampled, the appointment component 610 can evaluate individual parts of the signal part set. Based, at least in part, on a result of this evaluation the appointment component 610 can appoint signal parts that are to be part of the signal part group. In one embodiment, some members of the signal part set are appointed to the signal part group while others are not.

Figure 7:
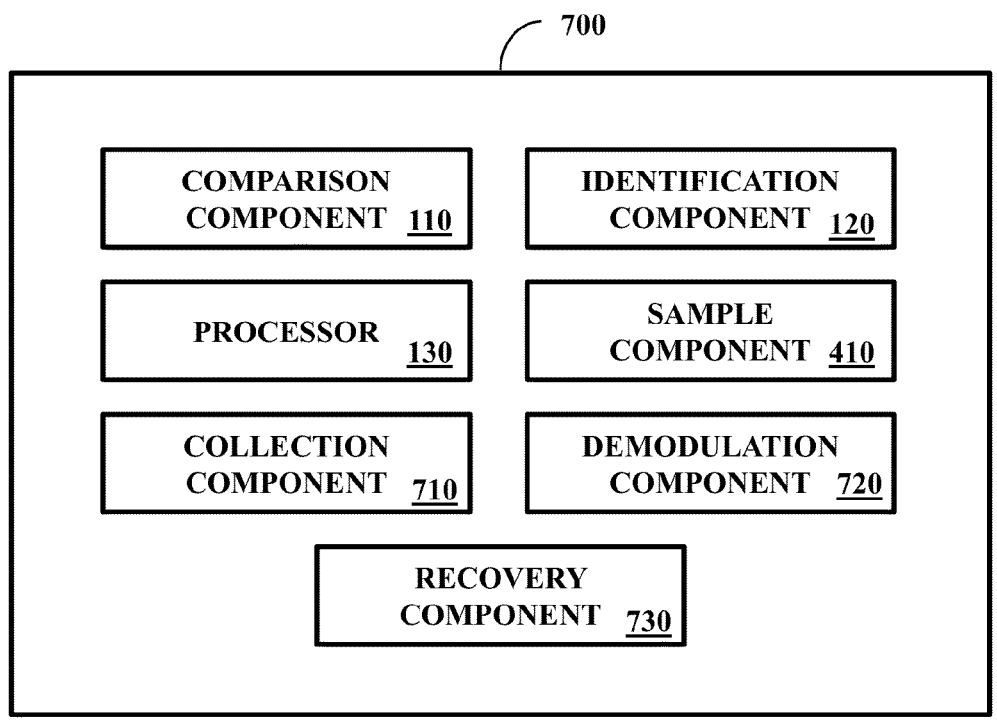
FIG. 7 illustrates one embodiment of a system comprising the comparison component, the identification component, the processor, the sample component, a collection component, a demodulation component, and a recovery component.

FIG. 7 illustrates one embodiment of a system 700 comprising the comparison component 110, the identification component 120, the processor 130, the sample component 410, a collection component 710, a demodulation component 720, and a recovery component 730. The collection component 710 is configured to collect the dual tone signal when the dual tone signal is a Radio Frequency signal. The demodulation component 720 is configured to demodulate the dual tone signal (e.g., not a pure dual signal that is unobstructed or uncorrupted with noise, fades, etc.) to produce a demodulated signal. The recovery component 730 is configured to recover a baseband signal from the demodulated signal, where the sample component 410 samples the baseband signal to sample the dual tone signal.

Figure 8:
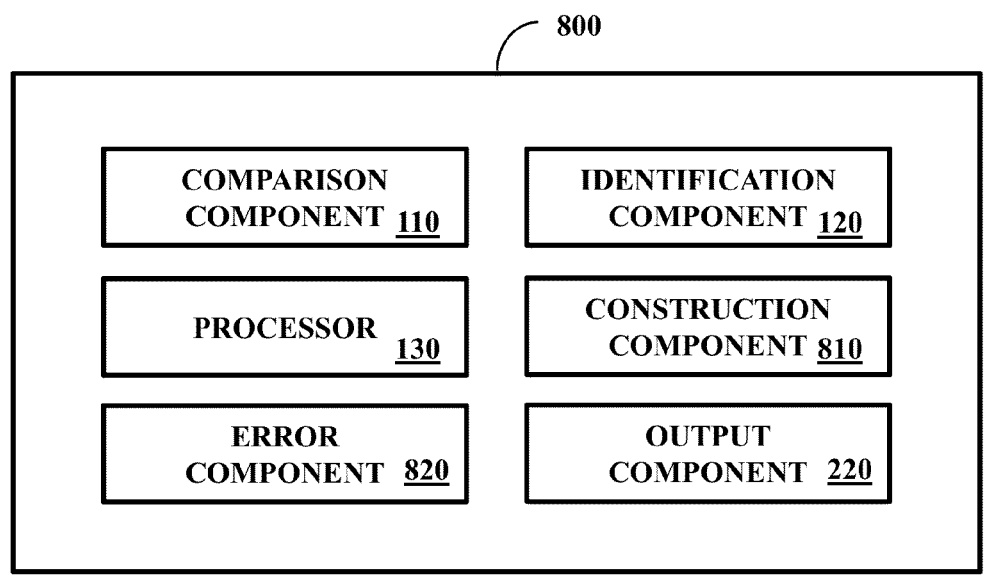
FIG. 8 illustrates one embodiment of a system comprising the comparison component, the identification component, the processor, a construction component, an error component, and the output component.

FIG. 8 illustrates one embodiment of a system 800 comprising the comparison component 110, the identification component 120, the processor 130, a construction component 810, an error component 820, and the output component 220. The construction component 810 is configured to construct a first error check window through use of the signal part group. The error component 820 is configured to make a determination when an error associated with the first error check window is not at a minimum, where the construction component 810 is configured to construct a subsequent error check window after the determination is that the error associated with the first error check window is not at a minimum. The output component 220 can be configured to cause an output that indicates the known signal that matches the dual tone signal when the error associated with the first error check window is at the minimum. The output component 220 can also be configured to cause the output that indicates the known signal that matches the dual tone signal when the error associated with the subsequent error check window is at the minimum.

Figure 9:
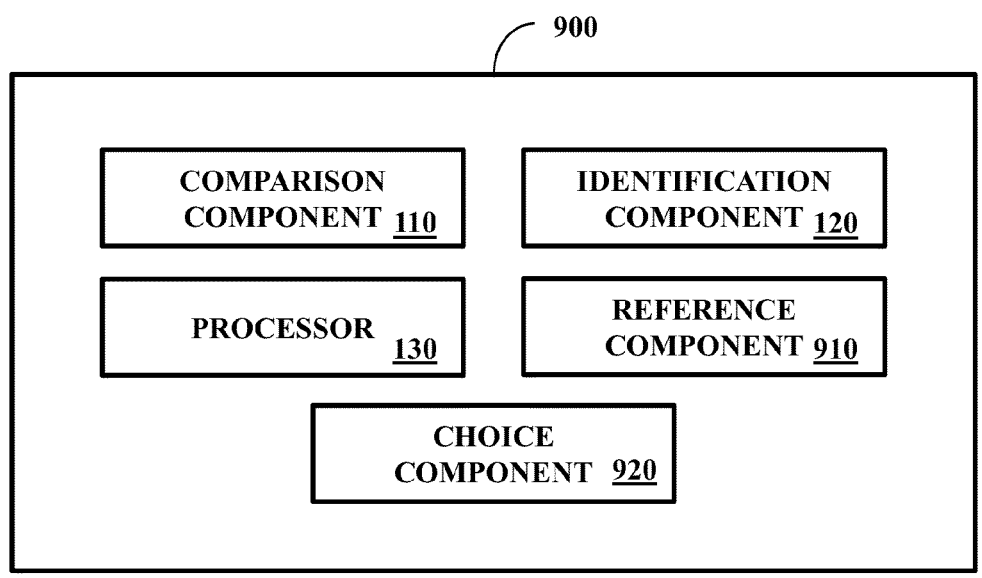
FIG. 9 illustrates one embodiment of a system comprising the comparison component, the identification component, the processor, a reference component, and a choice component.

FIG. 9 illustrates one embodiment of a system 900 comprising the comparison component 110, the identification component 120, the processor 130, a reference component 910, and a choice component 920. The reference component 910 is configured to choose a reference signal part of the dual tone signal. The choice component 920 is configured to choose the signal part group based, at least in part, on the reference signal, where the signal part group comprises the reference signal part and at least one non-reference signal part.

In one embodiment, the choice component 920 chooses the at least one non-reference signal part based, at least in part, on distance from the reference signal part. For example, the reference signal can be chosen arbitrarily, chosen based on a first signal part identified, etc. Once chosen, the choice component 920 can measure how far different signal parts (e.g., that are part of the signal part set) are from the reference signal. The result of this measurement can be used by the choice component 920 to determine if a signal part becomes part of the signal part group. In one example, the further away a signal part is, the more likely that signal part will become part of the signal part group.

Figure 10:
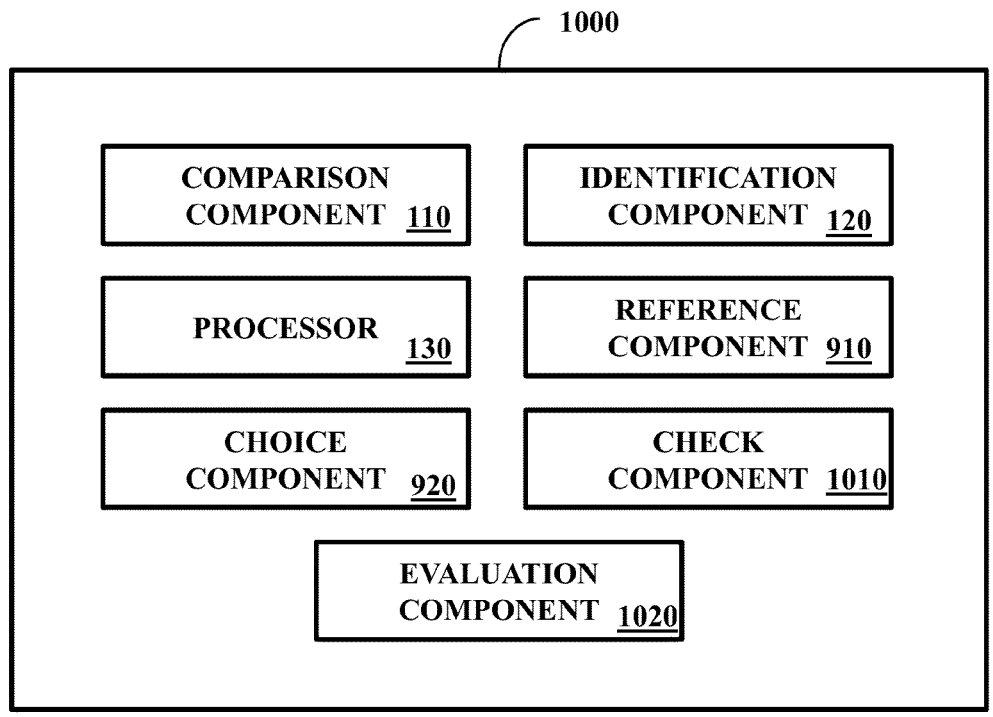
FIG. 10 illustrates one embodiment of a system comprising the comparison component, the identification component, the processor, the reference component, the choice component, a check component, and an evaluation component.

FIG. 10 illustrates one embodiment of a system 1000 comprising the comparison component 110, the identification component 120, the processor 130, the reference component 910, the choice component 920, a check component 1010, and an evaluation component 1020. The check component 1010 is configured to perform a check of an iteration of times the identification component 120 is unable to perform the identification. The evaluation component 1020 is configured to determine if the iteration meets a threshold, where the reference component 910 is configured to choose a different reference signal part of the dual tone signal in response to the iteration not meeting the threshold and where the choice component 920 is configured to choose the signal part group based, at least in part, on the different reference signal.

While the identification component 120 can attempt to identify a matching known signal to the signal part group and thus the dual tone signal, the attempt can be a failure. In one example, the comparison result can be such that no known signal matches enough with the signal part group (e.g., a percentage level is not reached, a confidence level is not high enough, etc.). Therefore, the identification component 120 may not be able to identify a known signal as a matching signal. While the system 1000 could stop, the system 1000 is also configured to attempt again, but this time with a different signal part group. The system 1000 can continue this until a match is identified or a threshold is met (e.g., reached, exceeded, not surpassed).

Figure 11:
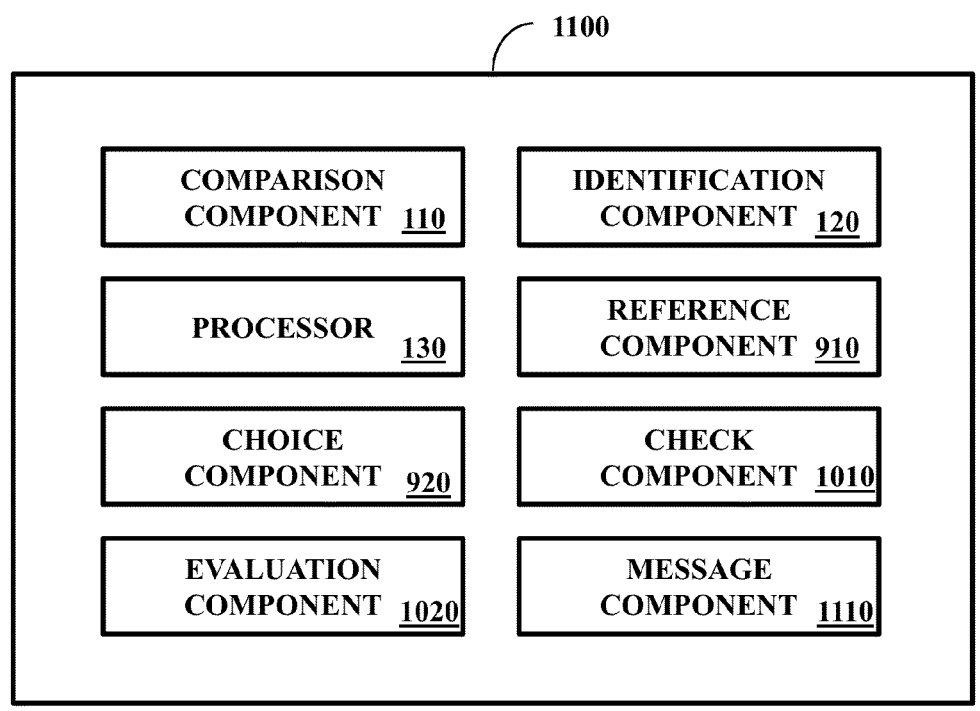
FIG. 11 illustrates one embodiment of a system comprising the comparison component, the identification component, the processor, the reference component, the choice component, the check component, the evaluation component, and a message component.

FIG. 11 illustrates one embodiment of a system 1100 comprising the comparison component 110, the identification component 120, the processor 130, the reference component 910, the choice component 920, the check component 1010, the evaluation component 1020, and a message component 1110. The message component 1110 is configured to produce an error message that is outputted in response to the iteration meeting the threshold. This error message can be to a user, to a sender of the dual tone signal, etc.

Figure 12:
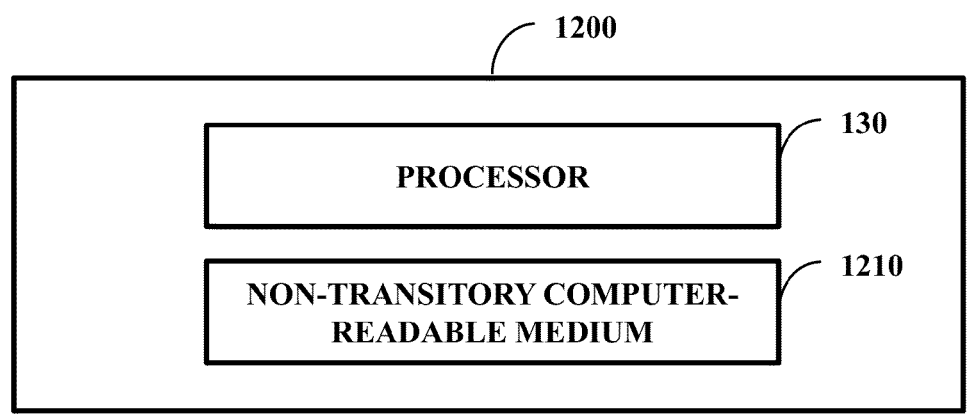
FIG. 12 illustrates one embodiment of a system comprising the processor and a non-transitory computer-readable medium.

FIG. 12 illustrates one embodiment of a system 1200 comprising the processor 130 and a non-transitory computer-readable medium 1210. In one embodiment the non-transitory computer-readable medium 1210 is communicatively coupled to the processor 130 and stores a processor executable command set to facilitate operation of at least one component disclosed herein. In one embodiment, a method can comprise executing instructions from the non-transitory computer-readable medium 1210 with the instructions comprising at least part of at least one method disclosed herein.

In one embodiment the non-transitory computer-readable medium 1210 is configured to store computer-executable instructions that when executed by the processor 130 cause the processor 130 to perform a method disclosed herein. One such method can comprise collecting a plurality of parts of an unknown signal, where a combination of the plurality of parts of the signal is less than the unknown signal and where the unknown signal is a dual tone signal or any other periodic signal as well as selecting a set of parts from the plurality of parts to form a subset of parts, where the subset of parts is smaller than the plurality of parts. The method can also comprise combining the subset of parts into a combined version and performing a Fast Fourier transform upon the combined version to produce a signal result. The method can further comprise comparing the signal result against a set of known signals to produce a comparison result, identifying a best match known signal from the set of known signals through use of the comparison result, and classifying the unknown signal as a signal type of the best match known signal.

In one embodiment, the subset of parts is a first subset of parts, the set of parts are a first set of parts, the combined version is a first combined version, the Fast Fourier transform is a first Fast Fourier transform, the signal result is a first signal result, and the comparison result is a first comparison result. With this embodiment, the method can comprise selecting a second set of parts from the plurality of parts to form a second subset of parts, where the second set of parts is different from the first set of parts. The method can also comprise combining the second subset of parts into a second combined version as well as performing the Fast Fourier transform upon the second combined version to produce a second signal result. The method can further comprise comparing the second signal result against the set of known signals to process a second comparison result along with determining a first error for the first comparison result and a second error for the second comparison result. In addition, the method can comprise identifying a smallest error of the first error and the second error, where identifying a best match known signal from the set of known signals is done through use of the comparison result with the smallest error.

Figure 13:
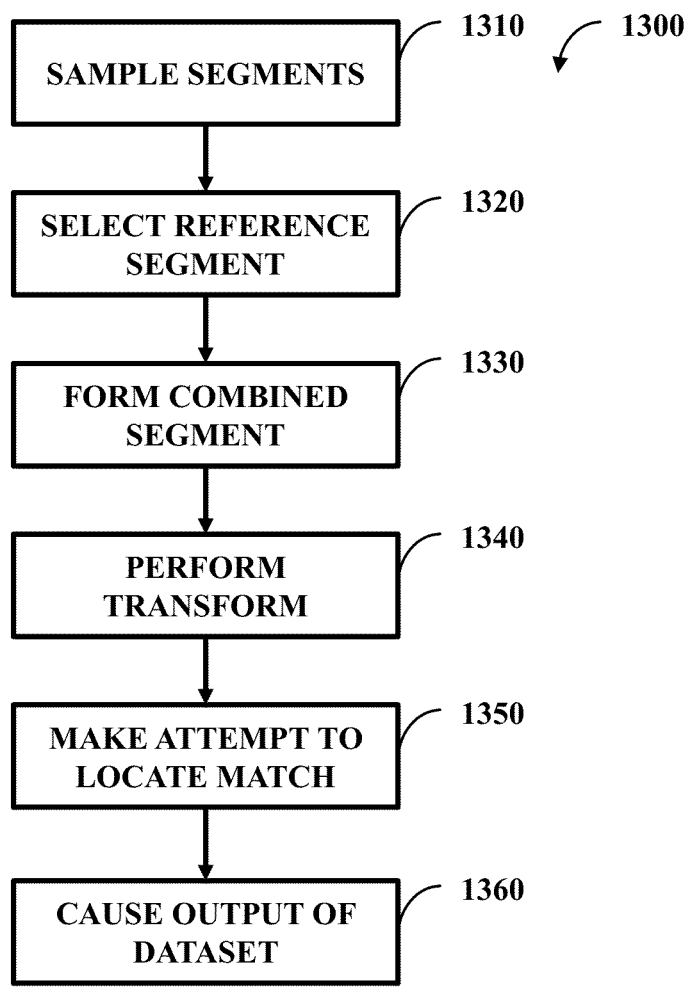
FIG. 13 illustrates one embodiment of a method that comprises various actions.

FIG. 13 illustrates one embodiment of a method 1300 that comprises various actions 1310-1360. At 1310 there is sampling of segments of a signal that is dual tone and periodic (e.g., the dual tone signal is periodic in nature), where the segments are outside of obstructions. At 1320 there is selecting a segment from the sampled segments as a reference segment. At 1330 combining the reference segment with at least one other sampled segment to form a combined segment occurs. At 1340 performing a Fast Fourier transform upon the combined segment that produces a transform result takes place. At 1350 an attempt is made to locate a match signal for the signal through use of the transform result. At 1360 there is causing a dataset that pertains to the match signal to be outputted in response to the match signal being located. In one example, this dataset can be a message that a match signal is found, as assignment of the signal as the match signal, etc.

Figure 14:
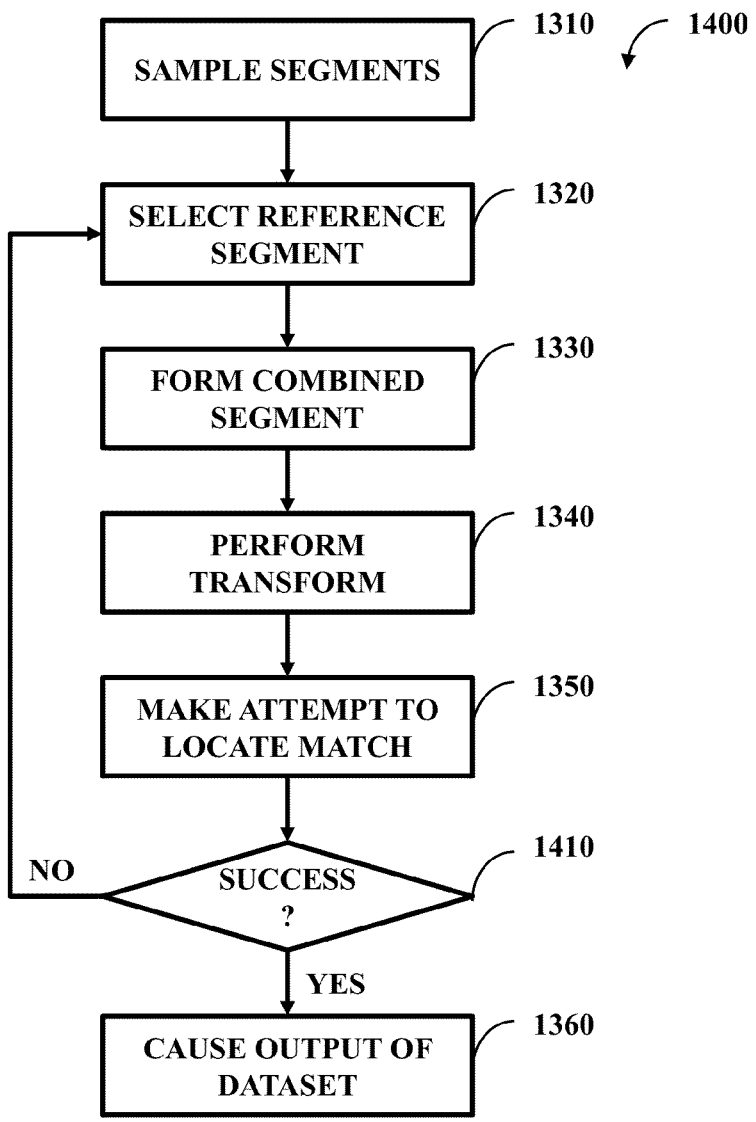
FIG. 14 illustrates one embodiment of a method that comprises various actions in addition to a check.

FIG. 14 illustrates one embodiment of a method 1400 that comprises various actions 1310-1360 in addition to a check 1410. In addition to selecting the reference segment, 1320 can include selecting a different segment as the reference segment and repeating the combining, performing, and making with the different segment in response to the attempt being unsuccessful, where the different segment is not the segment (e.g., a different segment is used than previously used). At 1410 checking if a threshold level is reached in response to the attempt being a failure can occur, where the different segment is selected in response to the threshold level not being reached.

Figure 15:
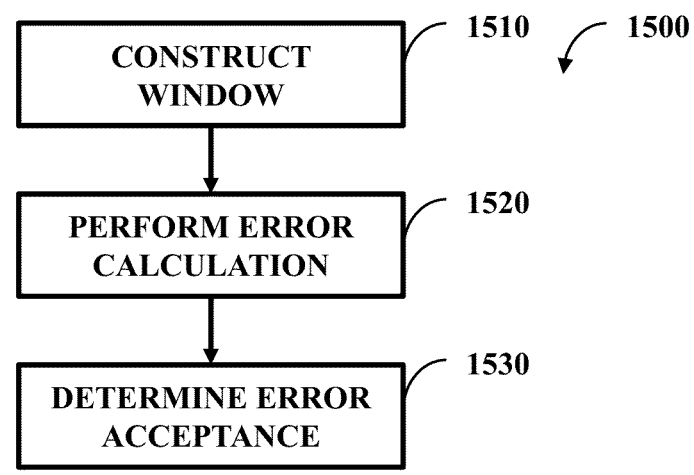
FIG. 15 illustrates one embodiment of a method comprising additional various actions.

FIG. 15 illustrates one embodiment of a method 1500 comprising additional various actions 1510-1530. At 1510 there is constructing a window that begins at the reference segment after the attempt to locate the match signal is successful. At 1520 performing an error calculation through use of the window to produce an error amount occurs. Determining if the error amount is acceptable, where the dataset is caused to be outputted in response to the error amount being acceptable occurs at 1630. In one embodiment, the method 1500 can be part of another method disclosed herein (e.g., actions 1510-1530 can be part of the method 1400 of FIG. 14).

Figure 16:
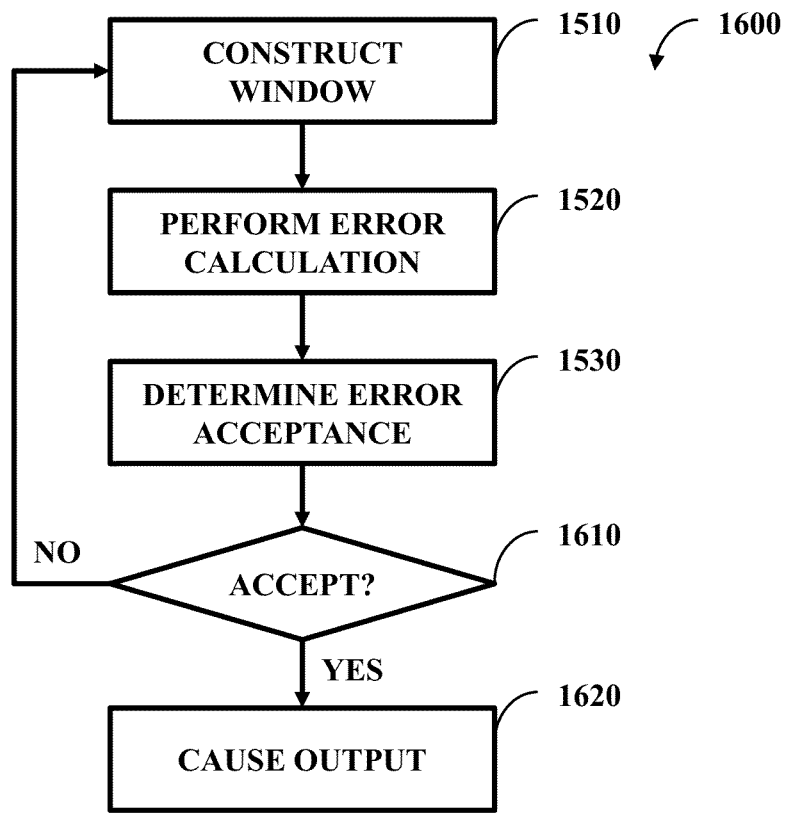
FIG. 16 illustrates one embodiment of a method comprising the additional various actions as well as a check and subsequent action.

FIG. 16 illustrates one embodiment of a method 1600 comprising the additional various actions as well as a check 1610 and subsequent action 1620. At 1610 a check can occur and if the check has a negative result, then the method 1600 can return to 1510. At 1510 there is changing the window when the error amount is not acceptable and then repeating performance of the error calculation at 1520. As with the method 1500 of FIG. 15, the check 1610 and/or action 1620 can be incorporated with the method 1400 of FIG. 14.

Aspects disclosed herein can relate to communications and signal analysis. In one example, underlying ideas disclosed herein can be used in extracting a signaling data string in cordless phones, non-message-oriented signaling of public switched telephone networks, etc.

Aspects disclosed herein can be used with regard to solving the following situation. A system can be transmitting DTMF tones. The transmitted signal, during propagation, can be subjected to periodic obstructions (e.g., interference, fades, etc.) that can be man-made or natural. As a result, only a few segments of the signal, such as of length $t_i$ and spaced $T_i$ seconds apart, are usable at a receiver. Since a minimum continuous signal length for extraction of signal characteristic features, while depending upon bandwidth, is usually more than $t_i$, it can be beneficial to determine how these small disjoint segments that are outside of obstructions should be selected and concatenated so that the DTMF tones can be recovered correctly.

DTMF tones which are periodic signals can be evaluated. A receiver can collect a few useful segments of the signal that can be of length $t_i$ (e.g., for an individual segment) and spaced $T_i$ seconds apart. For these segments, $t_i$ may or may not be the same as $t_j$. Similarly, different editions of $T_i$ may not be the same. In one embodiment, they may be randomly distributed between two values. Since these segments are so small that the characteristic features of the signal may not be able to be uniquely determined from a single segment, an iterative algorithm (or other embodiment) can be employed that shows how the disjoint segments should be selected and concatenated so that the receiver can correctly identify the transmitted key (e.g., tone of the signal).

The algorithm can begin choosing one of the segments arbitrarily, and then computing a metric that indicates how different this segment is from other segments. A few of these segments, the ones in which the metrics are among the largest, are concatenated.

The algorithm can begin choosing one of the segments arbitrarily, and then computing a metric that indicates how different this segment is from other segments. A few of these segments for which the metrics are among the largest are concatenated.

The algorithm then computes a Fast Fourier transform (FFT) of the concatenated signal, and determines a key whose tones are closest to the frequencies indicated by the FFT. Once a key has been found, an error between the DTMF tones of the key and the frequencies indicated by the FFT is minimized by creating a window out of the concatenated segments and then sliding the window one sample at a time to the right. If a key cannot be determined or if the frequencies of the FFT are outside a specified region, a different set of segments can be selected and the process is repeated.

If the received signal is aperiodic, selection of the small segments to be concatenated to form the required length can be rather straightforward, because no matter which segments are selected, their information contents are different, and therefore, the concatenated segments of a correct length would yield distinctive features of the signal with a high probability. If, on the other hand, the signal is periodic in nature, concatenation of improperly selected segments or improperly selected samples may result in redundant information, and therefore a given width of the concatenated signal may not reveal the characteristic features of the signal.

A DTMF signal can be represented as $$x(t) = a_1 \cos(\omega_1 t) + a_2 \cos(\omega_2 t) \quad (1)$$

where $\omega_1$ and $\omega_2$ are, respectively, the lower and upper frequencies. This is a periodic function whose time period depends upon $\omega_1$ and $\omega_2$, and can be determined by expanding it into a Fourier series.

Figure 17:
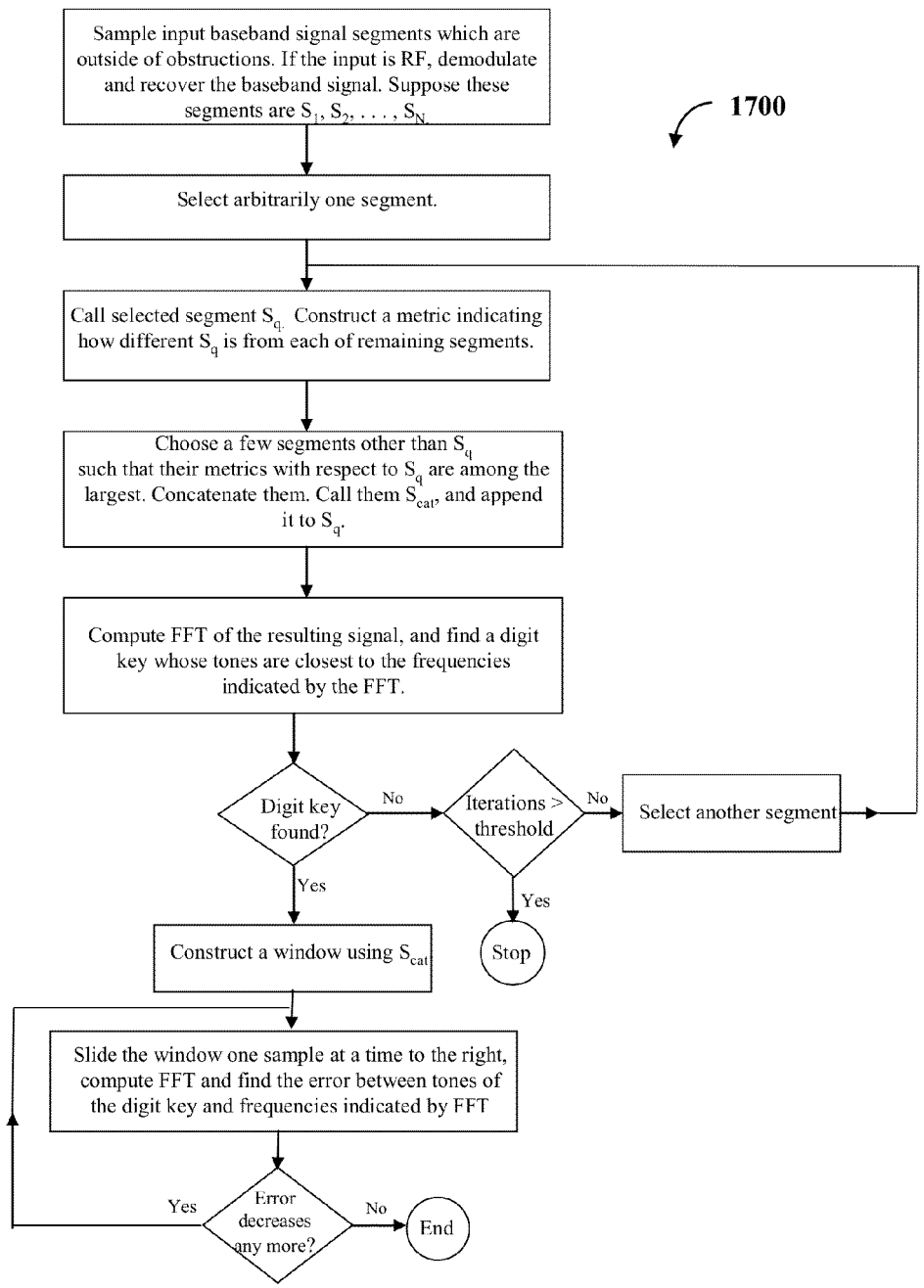
FIG. 17 illustrates one embodiment of a method that can be performed through use of an algorithm.

FIG. 17 illustrates one embodiment of a method 1700 that can be performed through use of an algorithm. The algorithm works as follows. The algorithm beings with receiving and sampling baseband signal at an appropriate rate (e.g., the sample component 410 of FIG. 4 selected such a rate). If the incoming signal is RF (Radio Frequency), the signal can be demodulated and with the demodulated signal the baseband signal can be recovered.

The sampled signal consists of N small segments $S_1$, $S_2$, ..., $S_N$. Segment $S_1$ is $t_i$-ms long and spaced $T_i$-ms apart. In general, as mentioned before, $t_i$ may not be the same as $t_j$. Similarly, each $T_i$ may be different. Choose $n_i$ complex samples from each segment $S_i$ to have:

$$S_i = \{s_{i,1}, s_{i,2}, \ldots, s_{i,n_i}\}$$

Selecting arbitrarily one of these segments, say $S_q$, can occur and this arbitrarily selected segment can be a reference segment.

Various metrics can be computed, such as $$M_{q,j} = \sum_k |s_{q,k} - s_{j,k}|, \quad j \neq q \quad (2)$$

and this can be done by taking the indicated sum over samples (e.g., all samples). $M_{q,j}$ is the distance between two segments $S_q$ and $S_j$, and indicates how different these two segments are from one another. Segments with longest distances are candidates for concatenation due to the different information provides by these different segments relative to one another.

Figure 18:
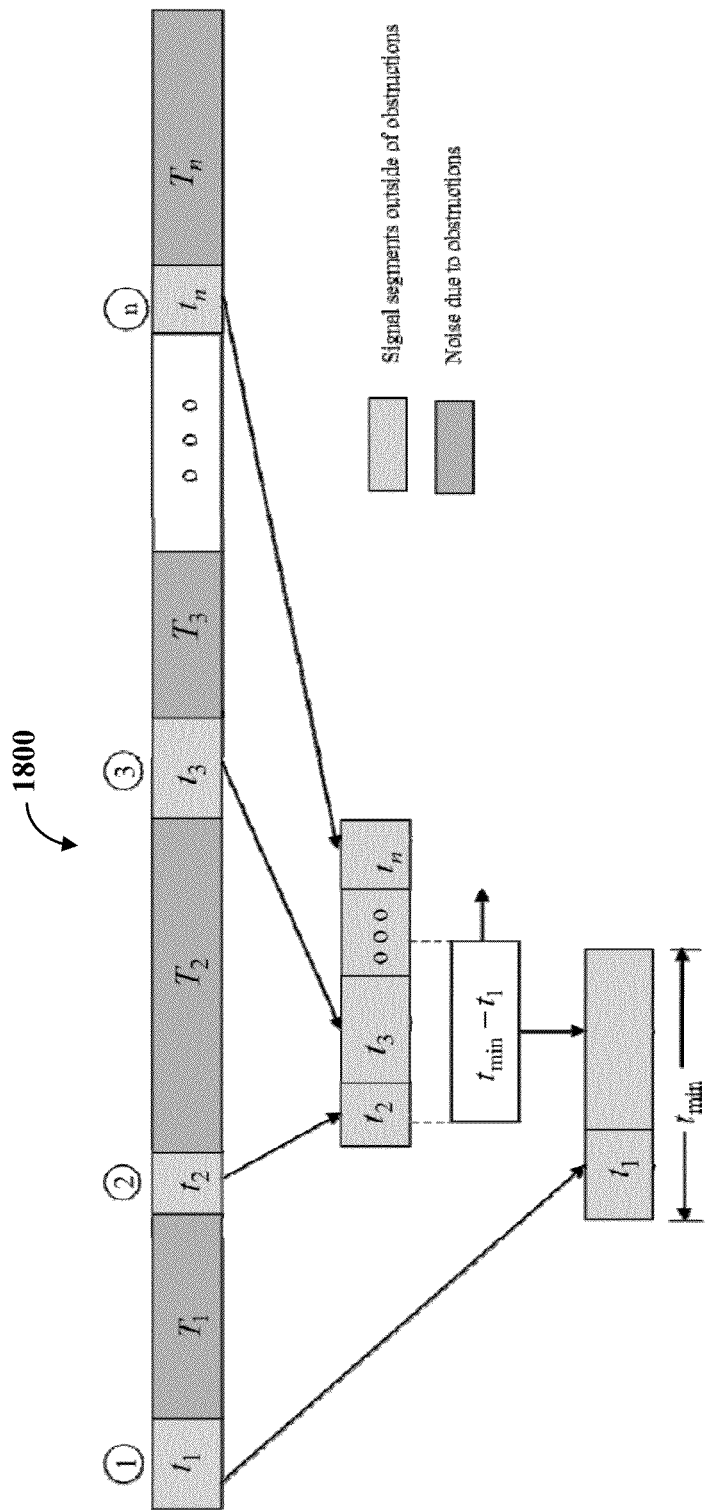
FIG. 18 illustrates one embodiment of a breakdown of a signal.

For DTMF tones, a few segments from the set of segments $\{S_q, n \neq q\}$ can be selected such that their metrics with respect to $S_q$ are among the largest. The selected segments are then concatenated. This concatenated signal can be noted as $S_{cat}$ and $S_{cat}$ can be appended to $S_q$. FIG. 18 illustrates one embodiment of a breakdown 1800 of a signal, such as $S_{cat}$.

The FFT of the resulting signal can be taken, and a digit key whose tones are closest to the frequencies indicated by the FFT can be found. If the digit key is not found and if the number of iterations are below a threshold, another segment can be selected as a reference segment, again calling it $S_q$, and this process is repeated. If the digit key is found, the algorithm can continue with constructing a window of length $t_{min} - t_q$ starting from the first sample of $S_{cat}$.

The window can be slid by one sample to the right, and then appended to $S_q$. The resulting signal is passed through an FFT computer, and the error between the tones of the key and frequencies indicated by the FFT is calculated. More exactly, the error is defined as follows. The following two tones—$\Omega_1$ and $\Omega_2$—are respectively the lower and upper tones detected in the FFT, and $f_L$ and $f_H$ are the lower and upper frequencies of the key. The error is taken to be $|\Omega_1 - f_L| + |\Omega_2 - f_H|$. The algorithm can keep sliding the window one sample at a time and repeat until the error is minimum or until the last sample of $S_{cat}$ is included in the window. If this difference is below a threshold, then the algorithm has obtained the desired concatenated signal.

To demonstrate the effectiveness of the algorithm, in one example DTMF tones corresponding to various keys can be transmitted over an FM carrier. The transmitted signal encountered obstructions for varying lengths of time. The discussion below uses key 5 (e.g., tones 770 Hz and 1336 Hz) in a hypothetical situation. The spacing between adjacent segments that are 1 ms long can be uniformly distributed between 5 and 15 ms. However, other implementations are possible such as the width of each segment could also be random. The signal-to-noise ratio of the useful segments can be 20 dB.

Figure 19:
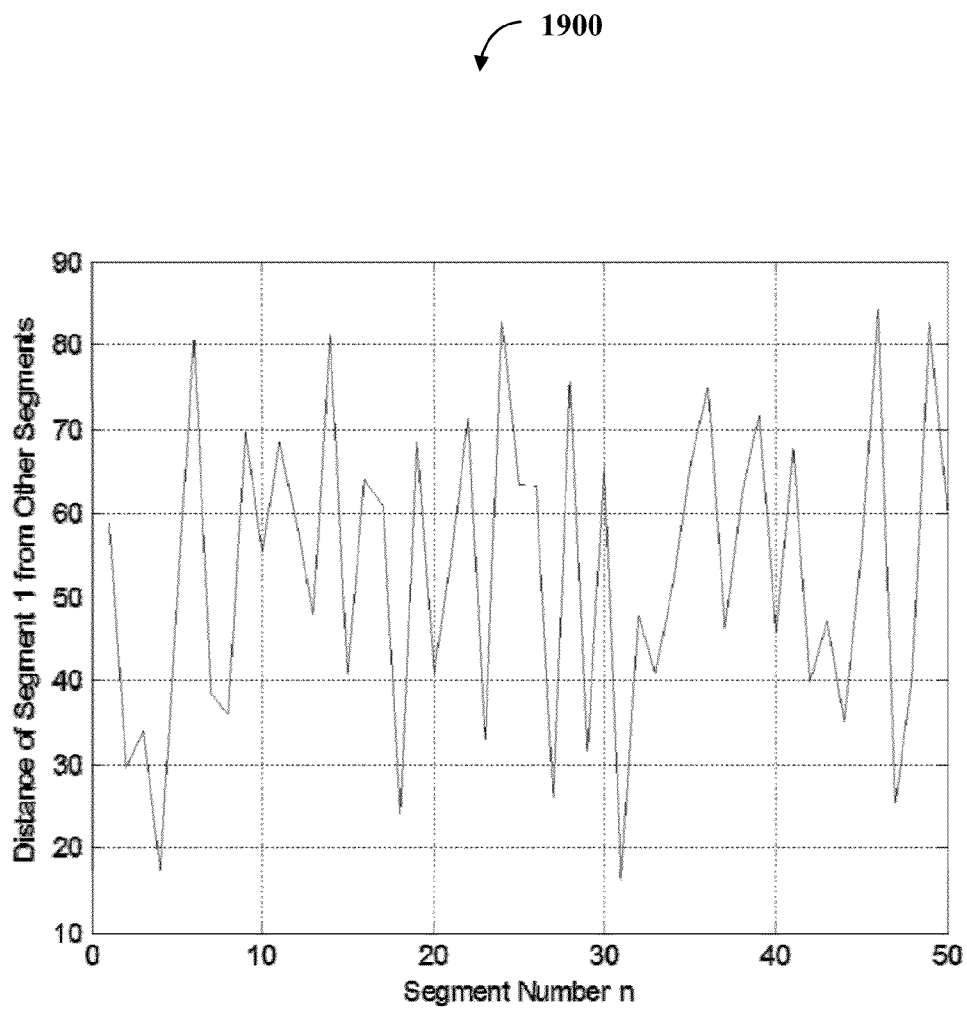
FIG. 19 illustrates one embodiment of a first graph.
Figure 20:
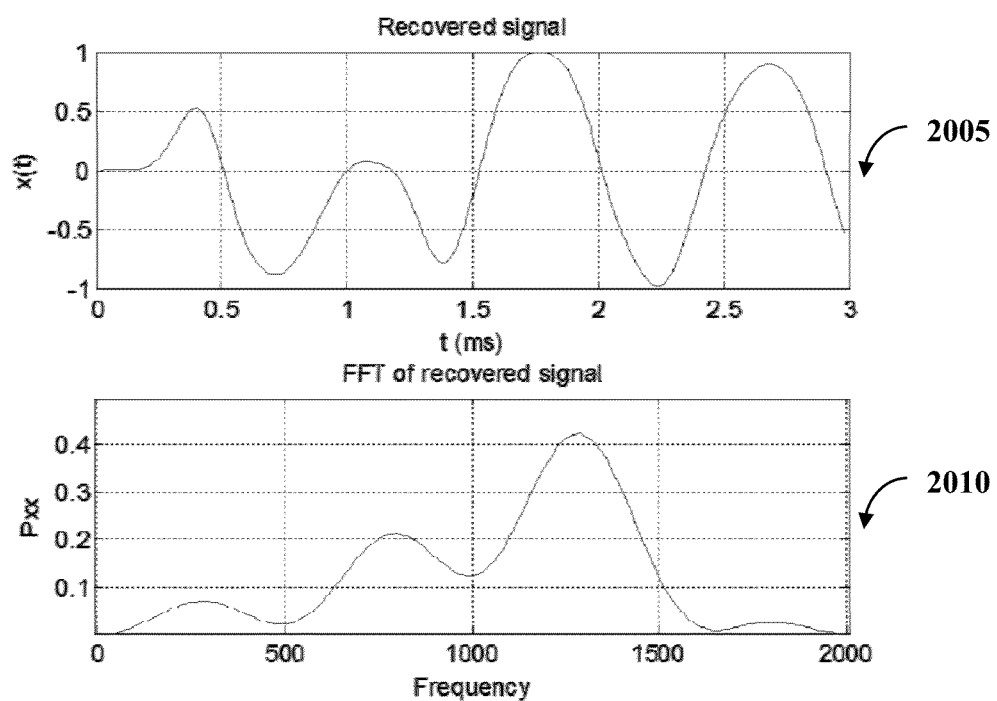
FIG. 20 illustrates one embodiment of a second graph and a third graph.

Segment 1 of the breakdown 1800 can be arbitrarily selected. To select the other segments for concatenation, their metrics with respect to segment 1 can be computed using expression (2) that is shown in the graph 1900 illustrated in FIG. 19. Those segments can be selected whose metrics were among the highest. Seven such segments can be designated 46, 24, 49, 14, 6, 28, and 36. Segments that give the closest match to a DTMF key can be: 1, 24, and 36 or 1, 14 and 36. Following the algorithm, the transmitted key can be found to be key 5 (e.g., of keypad with 0-9, *, #, and A-D). Frequencies of the FFT are seen to be 797 Hz and 1282 Hz, hence the error between these frequencies and the actual DTMF tones of this key is 81 Hz. The demodulated signal and its FFT are shown in 20 as illustrated in graphs 2005 and 2010.

Figure 21:
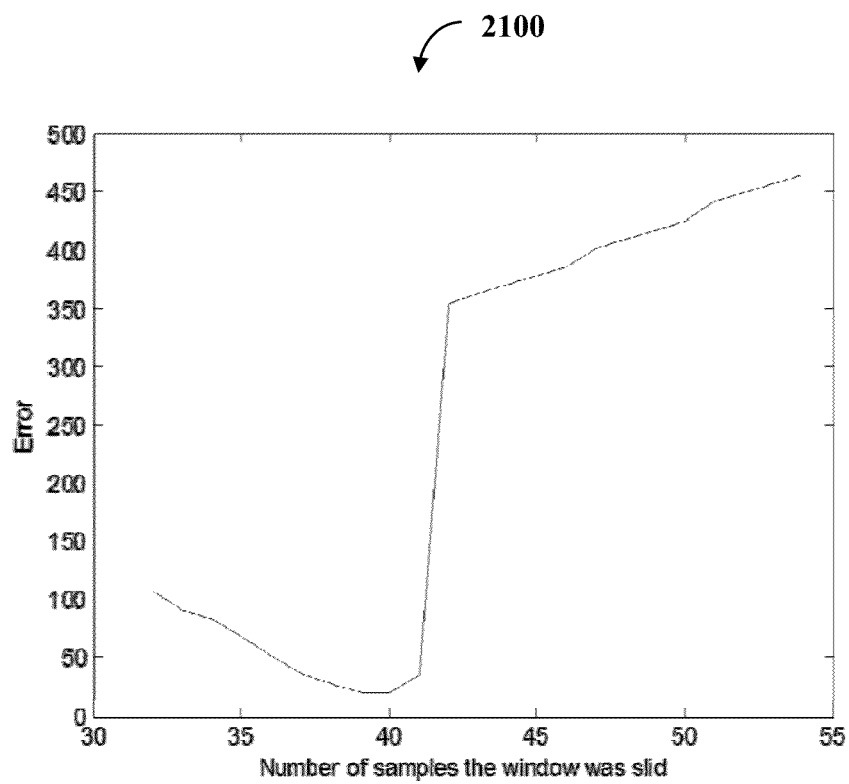
FIG. 21 illustrates one embodiment of a fourth graph.

To reduce the error between the detected and actual frequencies of this key, a 2-ms window can be constructed by concatenating segments 46, 14 and 49 in that order. Sliding the window one sample at a time, it was appended to segment 24. FIG. 21, and in turn graph 2100, shows how the error varies with the number of samples, say, n the window is slid through. A minimum error, which occurs in this example at n=40, is 19. This time the frequencies as indicated by the FFT are found to be 781 Hz and 1344 Hz compared to actual frequencies of 770 Hz and 1336 Hz for key 5.

The innovation presented in this disclosure has various applications. Examples include detecting signals that are usually transmitted in a number of short, disjoint bursts, radar signals, extracting signaling information in cordless phones, non-message-oriented signaling of public switched telephone networks, etc. Aspects disclosed herein can be practiced in these various applications.

What is claimed is:

1. A system, comprising:
   a comparison component configured to compare a signal part group of a dual tone signal against a known signal set to produce a comparison result, where the signal part group is less than the signal;
   an identification component configured to perform an identification of a known signal that matches the dual tone through use of the comparison result, where the known signal is part of the known signal set;
   a construction component configured to construct a first error check window through use of the signal part group;
   an error component configured to make a determination when an error associated with the first error check window is not at a minimum, where the construction component is configured to construct a subsequent error check window after the determination is that the error associated with the first error check window is not at a minimum;
   an output component configured to cause an output that indicates the known signal that matches the dual tone signal when the error associated with the first error check window is at the minimum and configured to cause the output that indicates the known signal that matches the dual tone signal when the error associated with the subsequent error check window is at the minimum; and
   a processor configured to execute an instruction that relates to the comparison component, the identification component, the construction component, the error component, the output component, or a combination thereof.

2. The system of claim 1, comprising:
   a designation component configured to make a designation of the dual tone signal as the known signal; and
   an output component configured to cause the designation to be outputted.

3. The system of claim 1, comprising:
   a computation component configured to perform a Fast Fourier transform upon the signal part group, where a result of performance of the Fast Fourier transform indicates at least one frequency of the signal part group and where the identification component uses the at least one frequency to perform the identification.

4. The system of claim 1, comprising:
   a sample component configured to sample the dual tone signal to produce the signal part group.

5. The system of claim 4, comprising:
   a determination component configured to make a determination if the dual tone signal is a Radio Frequency signal;
   a demodulation component configured to demodulate the dual tone signal in response to the dual tone signal being the Radio Frequency signal; and
   a selection component configured to make a selection of a signal part of the dual tone signal after demodulation if the determination is that the dual tone signal is the Radio Frequency signal and configured to make the selection of the signal part of the dual tone signal after the dual tone signal is sampled if the determination is that the dual tone signal is not the Radio Frequency signal.

6. The system of claim 4, comprising:
   an appointment component configured to appoint the signal part group, where the sample component samples the dual tone signal to produce a signal part set that comprises the signal part group as well as a discarded signal part set that is not part of the signal part group.

7. The system of claim 4, where the dual tone signal is a periodic signal and where the sample component functions when a full cycle of the dual tone signal is not available.

8. The system of claim 4, comprising:
   a collection component configured to collect the dual tone signal when the dual tone signal is a radio frequency signal;
   a demodulation component configured to demodulate the dual tone signal to produce a demodulated signal; and
   a recovery component configured to recover a baseband signal from the demodulated signal, where the sample component samples the baseband signal to sample the dual tone signal.

9. The system of claim 1, comprising:
   a reference component configured to choose a reference signal part of the dual tone signal; and
   a choice component configured to choose the signal part group based, at least in part, on the reference signal, where the signal part group comprises the reference signal part and at least one non-reference signal part.

10. The system of claim 1, where the dual tone signal indicates a selection of a key of a telephone keypad.

11. A system, comprising:
   a comparison component configured to compare a signal part group of a dual tone signal against a known signal set to produce a comparison result, where the signal part group is less than the signal;
   an identification component configured to perform an identification of a known signal that matches the dual tone signal through use of the comparison result, where the known signal is part of the known signal set;
   a reference component configured to choose a reference signal part of the dual tone signal;
   a choice component configured to choose the signal part group based, at least in part, on the reference signal, where the signal part group comprises the reference signal part and at least one non-reference signal part;
   a check component configured to perform a check of an iteration of times the identification component is unable to perform the identification; and
   an evaluation component configured to determine if the iteration meets a threshold, where the reference component is configured to choose a different reference signal part of the dual tone signal in response to the iteration not meeting the threshold and where the choice component is configured to choose the signal part group based, at least in part, on the different reference signal; and
   a processor configured to execute an instruction that relates to the comparison component, the identification component, the reference component, the choice component, the check component, the evaluation component, or a combination thereof.

12. The system of claim 11, comprising:
a message component configured to produce an error message that is outputted in response to the iteration meeting the threshold.

13. The system of claim 11, where the choice component chooses the at least one non-reference signal part based, at least in part, on distance from the reference signal part.

14. The system of claim 11, where the reference component is configured to arbitrarily choose the reference signal part of the dual tone signal.

15. The system of claim 11, where the dual tone signal indicates a selection of a key of a telephone keypad.

16. A method, comprising:
executing, instructions from a non-transitory computer-readable medium, the instructions comprising:
sampling segments of a signal that is multi-tone and periodic, where the segments are outside of obstructions;
selecting a first segment from the sampled segments as a reference segment;
combining the reference segment with at least one other sampled segment to form a combined segment;
performing a Fast Fourier transform upon the combined segment that produces a transform result;
making an attempt to locate a match signal for the signal through use of the transform result;
causing a dataset that pertains to the match signal to be outputted in response to the match signal being located;
checking if a threshold level is reached in response to the attempt being a failure; and
selecting a different segment from the first segment as the reference segment and repeating the combining, performing, and making with the different segment when the attempt is unsuccessful, where the different segment is selected in response to the threshold level not being reached.

17. The method of claim 16, the instructions comprising:
constructing a window that begins at the reference segment after the attempt to locate the match signal is successful;
performing an error calculation through use of the window to produce an error amount; and
determining if the error amount is acceptable, where the dataset is caused to be outputted in response to the error amount being acceptable.

18. The method of claim 17, the instructions comprising:
changing the window when the error amount is not acceptable and then repeating performance of the error calculation.

19. The method of claim 16, the instructions comprising:
producing an error message when the threshold level is reached; and
outputting the error message.

20. The method of claim 16, where the multi-tone signal is a dual tone signal that indicates a selection of a key of a telephone keypad.

\* \* \* \* \*